United States Patent [19]

Gellert

[11] Patent Number: 4,854,851
[45] Date of Patent: Aug. 8, 1989

[54] INJECTION MOLDING SYSTEM WITH INSERTABLE INSULATING RING

[76] Inventor: Jobst U. Gellert, 7A Prince St., Georgetown, Canada, L7G 2X1

[21] Appl. No.: 222,501

[22] Filed: Jul. 21, 1988

[51] Int. Cl.⁴ ............................................. B29C 45/20
[52] U.S. Cl. ................................ 425/549; 264/328.15; 425/570
[58] Field of Search ...................... 264/328.14, 328.15; 425/547, 549, 570, 582, 584

[56] References Cited

U.S. PATENT DOCUMENTS

| | | | |
|---|---|---|---|
| 4,053,271 | 10/1977 | Gellert | 425/562 |
| 4,557,685 | 10/1985 | Gellert | 425/549 |
| 4,705,473 | 11/1987 | Schmidt | 425/549 |

FOREIGN PATENT DOCUMENTS 549517 10/1987 Canada .
557681 1/1988 Canada .

Primary Examiner—Jay H. Woo
Assistant Examiner—Timothy W. Heitbrink
Attorney, Agent, or Firm—Riches, McKenzie & Herbert

[57] ABSTRACT

An injection molding system having a heated nozzle seated in a well in the mold with an insulative air space therebetween. The nozzle has a resilient sealing and locating flange which extends outward to bridge the air space rearward of a nose portion of the nozzle. The flange abuts against a cylindrical insulating ring which is seated in the mold. The insulating ring is made of a titanium alloy and has grooves in its outer surface which form air spaces to reduce heat loss from the nozzle through the sealing and locating flange.

5 Claims, 1 Drawing Sheet

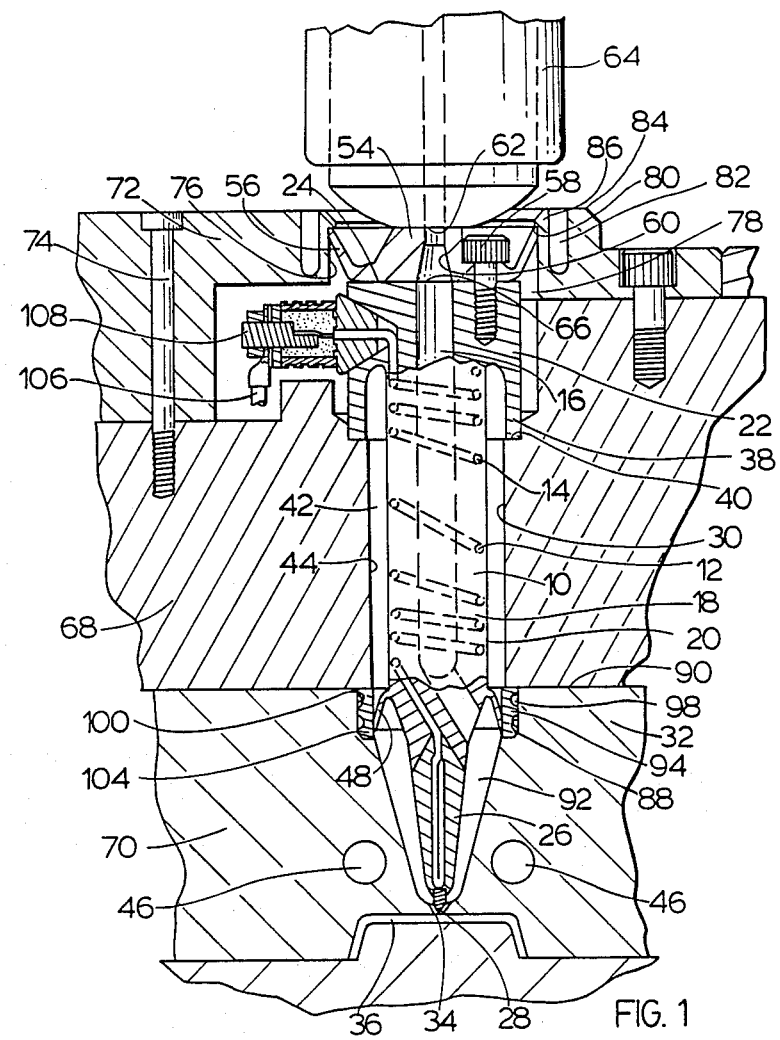
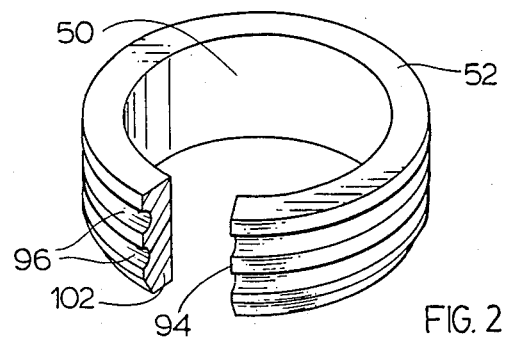
FIG. 1
FIG. 2

INJECTION MOLDING SYSTEM WITH INSERTABLE INSULATING RING

BACKGROUND OF THE INVENTION

This invention relates to injection molding and more particularly to an injection molding system having reduced heat loss from a heated nozzle to the surrounding cooled mold.

In this type of system, the heated nozzle is securely seated in a well in the cooled mold. As shown for instance, in the applicant's U.S. Pat. No. 4,557,685 entitled "Heated Nozzle for Injection Molding Apparatus" which issued Dec. 10, 1985, the nozzle has an insulation bushing which seats against a shoulder to locate the nozzle with an insulative air space between it and the surrounding mold. As is well known, it is critical to the successful operation of the system that the temperature of the melt be maintained within a predetermined narrow temperature range as it flows through the heated nozzle. However, it has been found that previous nozzles of this type suffer greater temperature drop at their ends than in the middle which makes a uniform temperature difficult to achieve. One attempt to deal with this problem is to increase the pitch of the helical heating element in the middle as shown, for instance, in the applicant's Canadian patent application Ser. No. 549,519 filed Oct. 16, 1987 entitled "Injection Molding Nozzle with Resilient Sealing and Locating Flange".

Canadian application Ser. No. 549,519 relates to a nozzle having a circumferential sealing and locating flange which extends across the insulative air space and abuts against the surrounding inner surface of the well in the cooled mold. As will be appreciated, this necessarily results in heat loss from the heated nozzle to the cooled mold. The applicant's Canadian patent application Ser. No. 557,681 filed Jan. 29, 1988 entitled "Improved Mounting for Injection Molding Nozzle" discloses reducing this problem by machining a circumferential groove in the cavity plate to form a thin wall portion against which the sealing and locating flange abuts. While this arrangement is a substantial improvement, it has the disadvantage of being relatively difficult to machine and still results in considerable heat loss from the nozzle.

SUMMARY OF THE INVENTION

Accordingly, it is an object of the invention to at least partially overcome the disadvantages of the prior art by providing a cylindrical insulating ring which seats in the mold for the sealing and locating flange to abut against.

To this end, in one of its aspects, the invention provides an injection molding system having an elongated heated nozzle with a forward end and a rear end seated in a well in a cooled mold with minimal contact bridging an insulative air space provided between the heated nozzle and the surrounding cooled mold, the nozzle having a central portion with a generally cylindrical outer surface extending between a collar portion adjacent the rear end and a nose portion adjacent the forward end, the nozzle having a melt bore extending from a central inlet at the rear end through the central portion and the nose portion to convey pressurized melt from the inlet towards at least one gate extending from the well to a cavity, the nozzle having an electrically insulated heating element with a spiral portion which extends integrally in the central portion around the melt bore, the nozzle having a circumferential sealing and locating flange which extend outwardly between the central portion and the nose portion to bridge the insulative air space around the nozzle, the improvement wherein: a cylindrical insulating ring having an inner surface, and an outer surface is seated in a circumferential seat in the mold in a position whereby the outwardly extending flange of the nozzle is in sealing contact with the inner surface of the ring, the seat in the mold having a cylindrical inner surface and the outer surface of the ring having at least one circumferential groove to form an insulating air space between the outer surface of the ring and the inner surface of the seat in the mold.

Further objects and advantages of the invention will appear from the following description taken together with the accompanying drawings.

BRIEF DESCRIPTION OF THE DRAWINGS

FIG. 1 is a sectional view of a portion of an injection molding system according to a preferred embodiment of the invention, and FIG. 2 is an isometric view of the insulating ring shown in FIG. 1.

DETAILED DESCRIPTION OF THE DRAWINGS

Reference is first made to FIG. 1 which shows a single nozzle sprue gated injection molding system according to a preferred embodiment of the invention. The elongated nozzle 10 has an integral electrical heating element 12 which is brazed in with a spiral portion 14 extending around a melt bore 16 as described in the applicant's Canadian patent application Ser. No. 549,517 filed Oct. 16, 1987 entitled "Injection Molding Nozzle Having Grounded Heating Element Brazed into Pointed Tip". The nozzle 10 has a central portion 18 with a generally cylindrical outer surface 20 extending between a collar portion 22 adjacent the rear end 24 and a tapered nose portion 26 extending to the forward end 28. The nozzle 10 is seated in a well 30 in the mold 32 with the forward end 28 in alignment with a gate 34 extending from the well 30 to a cavity 36. The collar portion 22 forms an insulation bushing 38 which seats against a shoulder 40 to support the nozzle 10 in a position wherein an insulative air space 42 is provided between the heated nozzle 10 and the inner surface 44 of the surrounding mold which is cooled by water flowing through cooling conduits 46. The nozzle 10 also has an integral circumferential sealing and locating flange 48 which extends outwardly between the central portion 18 and the nose portion 26 as described in the applicant's Canadian patent application No. 549,519, referred to above. This flange 48 extends across the air space 42 and abuts against the inner surface 50 of a cylindrical insulating ring 52 which is seated in the mold 32 as described in more detail below to provide a seal against the leakage of pressurized melt and to accurately align the forward end 28 of the nozzle 10 with the gate 34.

As described in the applicant's Canadian patent application Ser. No. 557,681 referred to above, a backplate 54 having a relatively thin flanged portion 56 is secured to the rear end 24 of the nozzle 10 by bolts 58. The backplate has a central bore 60 which is in alignment with an outlet 62 from the molding machine nozzle 64 and an inlet 66 to the melt bore 16 through the nozzle 10. As is well known, the mold can be made with a variety of different components and plates depending upon the desired shape of the cavity 36. In the present case, the mold has a support plate 68 which is secured between a cavity plate 70 and a circular retaining collar 72 which is secured to it by bolts 74 in a conventional manner. As can be seen, the retaining collar 72 has a central opening 76 therethrough which receives the rear end 24 of the nozzle 10 and the backplate 54 bolted to it. The opening 76 is sufficiently larger in diameter than the rear end 24 of the nozzle 10 to provide an insulative air space 78 between them. The flanged portion 56 of the backplate 54 extends outwardly and rearwardly across the air space 78 and abuts against a shoulder 80 which extends inwardly from the retaining collar 72. Thus, when the system is assembled and the collar 72 is bolted tightly into the position shown, it engages the flanged portion 56 of the backplate 54 and holds the nozzle 10 securely in place in the well 30. Although the backplate 54 and the retaining collar 72 are made of steel, it will be appreciated that the relatively thin shape of the flanged portion 56 of the backplate 54 results in substantially less heat loss than if the retaining collar 72 abuts directly against the rear end 24 of the nozzle. In order to further reduce heat loss through the flanged portion 56, a deep circumferential groove 82 is machined in the rear face 84 of the retaining collar 72. This provides a thin wall portion 86 having the shoulder 80 against which the flanged portion 56 of the backplate 54 abuts.

In order to reduce similar heat loss from the nozzle 10 through the sealing and locating flange 48, a cylindrical insulating ring 52 is received in a seat 88 which extends from the rear face 90 of the cavity plate 70. The insulating ring 52 has a cylindrical inner surface 50 against which the sealing and locating flange 48 abuts during use. The flange 48 is made of resilient metal whereby the force of the pressurized melt in the space 92 around the nose portion 26 forces it into tight sealing contact against the inner surface 50 of the insulating ring 52 which prevents escape of the pressurized melt into the insulative air space 42 surrounding the central portion 18 of the nozzle 10. As can be seen, in this embodiment of the invention, the outer surface 94 of the insulating ring 52 has two spaced circumferentially extending grooves 96, each of which provides an insulating air space 98 between the outer surface 94 of the insulating ring 52 and the cylindrical inner surface 100 of the seal 88 in the cooled cavity plate. In addition, the insulating ring 52 has a beveled outer corner 102 which provides another insulating air space 104. Thus, surface contact between the insulating ring 52 and the cavity plate is reduced considerably which reduces heat loss. Furthermore, the insulating ring 52 is made of a relatively poor heat conductive metal such as a titanium alloy which further reduces heat loss.

In use, after the injection molding system has been assembled as shown and described above, electrical power is applied to the heating element 12 by a lead 106 connected to the cold terminal 108 to heat the nozzle 10 to a predetermined operating temperature. Pressurized melt is then introduced from the outlet 62 of the molding machine nozzle 64 through the central bore 60 of the backplate 54 and into the melt bore 16 of the nozzle 10. The pressurized melt flows through the nozzle 10 into the space 92 surrounding the heated nose portion 26 of the nozzle 10 and then through the gate 34 into the cavity 32. The space 92 remains filled with melt, a portion of which solidifies adjacent the cooled cavity plate 70 and the sealing and locating flange 48, preventing it escaping into the insulative air space 42. After the cavities are filled, injection pressure is held momentarily to pack and then released. After a short cooling period, the mold is opened to eject the molded products After ejection, the mold is closed and injection pressure is reapplied to refill the cavity 34. This cycle is continuously repeated with a frequency dependent on the size and shape of the cavity and the type of material being molded.

While the description of the system and its use have been given with respect to a preferred embodiment, it is not be construed in a limiting sense. Variations and modifications will occur to those skilled in the art. For instance, it is apparent that the insulating ring 52 can have other configurations and be made of other suitable materials which reduce heat loss from the nozzle 10 through the sealing and locating flange 48. Although a single nozzle system has been shown and described, it is apparent that the invention applies to a multi-nozzle injection molding system as well. Reference is made to the appended claims for a definition of the invention.

What I claim is:

1. In an injection molding system having an elongated heated nozzle with a forward end and a rear end, said nozzle being seated in a well in a cooled mold with minimal contact bridging an insulative air space provided between the heated nozzle and the surrounding cooled mold, the nozzle having a central portion with a generally cylindrical outer surface extending between a collar portion adjacent the rear end and a nose portion adjacent the forward end, the nozzle having a melt bore extending from a central inlet at the rear end through the central portion and the nose portion to convey pressurized melt from the inlet towards at least one gate extending from the well to a cavity, the nozzle having an electrically insulated heating element with a spiral portion which extends integrally in the central portion around the melt bore, the nozzle having a circumferential sealing and locating flange which extends outwardly between the central portion and the nose portion to bridge the insulative air space around the nozzle, the improvement wherein:

a cylindrical insulating ring having an inner surface, and an outer surface is seated in a circumferential seat in the mold in a position whereby the outwardly extending flange of the nozzle is in sealing contact with the inner surface of the ring, the seat in the mold having a cylindrical inner surface and the outer surface of the ring having at least one circumferential groove to form an insulating air space between the outer surface of the ring and the inner surface of the seat in the mold.

2. A system as claimed in claim 1 wherein the outer surface of the insulating ring has a plurality of spaced circumferential grooves.

3. A system as claimed in claim 2 wherein the insulating ring is made of a titanium alloy.

4. A system as claimed in claim 3 wherein the inner surface of the insulating ring is cylindrical.

5. A system as claimed in claim 4 wherein the mold includes a support plate which abuts against a cavity plate with the well which receives the nozzle extending through the support plate into the cavity plate, the seat which receives the insulating ring being formed in the cavity plate adjacent the support plate.

* * * * *